(12) United States Patent
Schenk et al.

(10) Patent No.: US 11,719,119 B1
(45) Date of Patent: Aug. 8, 2023

(54) AIRCRAFT WITH RAM AIR TURBINE DISK WITH GENERATOR HAVING BLADE SHROUD RING INTEGRATED MAGNETS

(71) Applicant: Rolls-Royce Corporation, Indianapolis, IN (US)

(72) Inventors: Peter M. Schenk, Greenwood, IN (US); Rigoberto Rodriguez, Avon, IN (US); David Locascio, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/702,757

(22) Filed: Mar. 23, 2022

(51) Int. Cl.
| | | |
|---|---|---|
| *F01D 15/10* | (2006.01) | |
| *F01D 5/14* | (2006.01) | |
| *F01D 11/12* | (2006.01) | |
| *B64D 41/00* | (2006.01) | |
| *F04D 29/18* | (2006.01) | |
| *H02K 7/18* | (2006.01) | |
| *H02K 1/2706* | (2022.01) | |
| *H02K 1/276* | (2022.01) | |

(52) U.S. Cl.
CPC .......... *F01D 15/10* (2013.01); *B64D 41/007* (2013.01); *F01D 5/147* (2013.01); *F01D 11/122* (2013.01); *F04D 29/186* (2013.01); *H02K 1/2706* (2013.01); *H02K 1/276* (2013.01); *H02K 7/1823* (2013.01); *F05D 2220/34* (2013.01); *F05D 2220/768* (2013.01); *F05D 2240/307* (2013.01); *F05D 2260/232* (2013.01); *F05D 2260/30* (2013.01)

(58) Field of Classification Search
CPC .......... F01D 15/10; F01D 5/147; F01D 9/041; F01D 11/122; F02C 7/32; F05D 2220/34; F05D 2220/768; F05D 2240/307; F05D 2260/232; F05D 2260/30; B64D 41/007; F04D 25/066; F04D 29/186; F05B 2220/31; F03D 9/32
See application file for complete search history.

(56) References Cited

U.S. PATENT DOCUMENTS

| | | | |
|---|---|---|---|
| 5,376,827 A | 12/1994 | Hines | |
| 5,551,840 A * | 9/1996 | Benoit | F01D 11/12 416/241 B |
| 5,564,903 A | 10/1996 | Eccles et al. | |
| 5,607,329 A | 3/1997 | Cho et al. | |
| 5,997,248 A * | 12/1999 | Ghasripoor | F01D 11/12 428/404 |
| 6,127,758 A | 10/2000 | Murry et al. | |
| 7,603,864 B2 | 10/2009 | Gemin et al. | |

(Continued)

FOREIGN PATENT DOCUMENTS

| | | |
|---|---|---|
| CN | 101374724 B | 4/2012 |
| CN | 104500267 A | 4/2015 |

(Continued)

*Primary Examiner* — Brian Christopher Delrue
(74) *Attorney, Agent, or Firm* — Barnes & Thornburg LLP

(57) ABSTRACT

The present disclosure is directed to an aircraft with an accessory system configured to be powered independent of the primary propulsion system by a ram air turbine power system. The ram air turbine power system illustratively includes an accessory generator integrated with a turbine rotor as well as other components so as to manage space claim and offer unique functionality.

20 Claims, 10 Drawing Sheets

(56) References Cited

U.S. PATENT DOCUMENTS

| | | |
|---|---|---|
| 7,837,141 B2 | 11/2010 | Kennedy et al. |
| 7,841,163 B2 | 11/2010 | Welch et al. |
| 7,982,328 B2 | 7/2011 | Huntemann |
| 8,146,369 B2 | 4/2012 | Walitzki et al. |
| 8,299,669 B2 | 10/2012 | Gieras et al. |
| 8,766,471 B2 | 7/2014 | Orea |
| 8,790,079 B2 | 7/2014 | Tersmette et al. |
| 8,970,059 B2 | 3/2015 | Russ et al. |
| 9,143,023 B1 | 9/2015 | Uskert |
| 9,908,635 B2 | 3/2018 | Snyder |
| 10,030,961 B2 | 7/2018 | Dzięciol et al. |
| 10,094,336 B2 | 10/2018 | Makowski et al. |
| 10,399,694 B2 | 9/2019 | Huang et al. |
| 10,752,375 B2 | 8/2020 | Snyder |
| 10,897,182 B1 * | 1/2021 | Merrett ............... H02K 21/22 |
| 10,899,467 B2 | 1/2021 | Hausmann |
| 10,954,792 B2 | 3/2021 | Lugg |
| 10,954,875 B2 | 3/2021 | Weightman et al. |
| 2002/0122717 A1 | 9/2002 | Ghetzler et al. |
| 2007/0115163 A1 * | 5/2007 | Brittingham ............. H01Q 3/46 |
| | | 342/13 |
| 2008/0042507 A1 | 2/2008 | Edelson |
| 2008/0075593 A1 * | 3/2008 | Read ................... F04D 29/023 |
| | | 415/177 |
| 2008/0110151 A1 | 5/2008 | Welch et al. |
| 2009/0026770 A1 | 1/2009 | Huntemann |
| 2009/0206208 A1 | 8/2009 | Kennedy et al. |
| 2010/0314885 A1 * | 12/2010 | Presz, Jr. ............... H02K 7/183 |
| | | 290/55 |
| 2011/0031760 A1 * | 2/2011 | Lugg ................... H02K 7/1838 |
| | | 290/55 |
| 2012/0093668 A1 | 4/2012 | Gieras et al. |
| 2012/0148424 A1 | 6/2012 | Hopewell et al. |
| 2012/0301290 A1 * | 11/2012 | Justak ..................... F03D 9/00 |
| | | 415/208.2 |
| 2013/0181448 A1 | 7/2013 | Larson et al. |
| 2013/0257053 A1 | 10/2013 | Russ |
| 2014/0077498 A1 | 3/2014 | Orea |
| 2014/0232117 A1 * | 8/2014 | Spooner .................. H02K 3/28 |
| | | 290/54 |
| 2015/0044018 A1 * | 2/2015 | Dierksmeier ......... F01D 11/001 |
| | | 415/173.2 |
| 2018/0118363 A1 * | 5/2018 | Keller .................... B64D 35/04 |
| 2019/0300199 A1 | 10/2019 | Hausmann |
| 2022/0393548 A1 * | 12/2022 | Puttichaem ............. F03D 15/00 |

FOREIGN PATENT DOCUMENTS

| | | |
|---|---|---|
| CN | 104500267 B | 2/2016 |
| CN | 110318880 A | 10/2019 |
| CN | 110318880 B | 11/2021 |
| DE | 102006003138 A1 | 8/2007 |
| EP | 2715124 B1 | 6/2016 |
| JP | 2020083062 A | 6/2020 |
| WO | 2012091828 A2 | 7/2012 |
| WO | 2012091828 A3 | 8/2012 |
| WO | 2012166271 A3 | 4/2013 |
| WO | 2018075020 A1 | 4/2018 |

\* cited by examiner

AIRCRAFT WITH RAM AIR TURBINE DISK WITH GENERATOR HAVING BLADE SHROUD RING INTEGRATED MAGNETS

FIELD OF THE DISCLOSURE

The present disclosure relates generally to aircraft accessory power systems, and more specifically to ram air turbines for powering aircraft accessories.

BACKGROUND

Aircraft have been fitted with ram air turbines (RATs) configured to generate power from ram pressure derived from the airstream across a moving aircraft. These ram air turbines have been used in emergency situations in the case of primary power source loss to operate critical controls, hydraulics, and/or instrumentation.

Ram air turbines have also been incorporated into independent units or pods included in aircraft. Use of ram air turbines in independent units allows installation onto aircraft without dedicated power supplies from primary electrical systems of the aircraft. Some such independent units have incorporated exposed turbine rotors coupled via shafts to generators to power electronics or to pressurize hydraulics.

Next generation independent units or pods for use with existing or new aircraft continue to demand independent power generation capability to provide flexibility of use. In these aircraft improved packaging and functionality for ram air turbine technology is of significant interest.

SUMMARY

The present disclosure may comprise one or more of the following features and combinations thereof.

According to an illustrative aspect of the present disclosure, an aircraft includes a propulsion system, an accessory system, and a ram air turbine power system. The propulsion system is configured to produce thrust for driving the aircraft during operation. The accessory system is electrically decoupled from the propulsion system so as to not to directly draw power from the propulsion system. The ram air turbine power system is electrically coupled to the accessory system to provide energy for use by the accessory system.

The ram air turbine power system includes a turbine case, a turbine rotor, and an accessory generator. The turbine case extends around a central axis. The turbine rotor is mounted for rotation about the central axis. The accessory generator is coupled to the turbine rotor.

The turbine rotor includes an outer diameter, an inner diameter, and airfoils. The outer diameter is in confronting relation with the turbine case. The inner diameter is spaced radially inward of the outer diameter. The airfoils are arranged between the outer diameter and the inner diameter. Each airfoil extends from a base radially outward to a tip thereof.

The accessory generator includes a stator and a magnet ring. The stator is coupled with the turbine case and is axially aligned with the airfoils of the turbine rotor. The stator also includes a plurality of stator windings. The magnet ring is coupled to at least two airfoils included in the plurality of airfoils.

The magnet ring includes a band and a plurality of magnets. The band extends circumferentially at least partway about the central axis and is coupled to the tip of at least two airfoils included in the plurality of airfoils. The plurality of magnets are coupled with the band so that, upon rotation of the magnet ring with the turbine rotor, electrical power is generated for use by the accessory system.

In some embodiments, each of the airfoils defines a chord that extends from a leading edge to a trailing edge of the airfoil. The magnet ring is located axially on a mid-chord of the chord of the airfoil.

In some embodiments, the magnet ring extends circumferentially completely around the central axis and is coupled to each of the airfoils.

In some embodiments, each of the airfoils defines a chord that extends from a leading edge to a trailing edge of the airfoil. The magnet ring extends axially substantially a full axial length of the chord between the leading edge and the trailing edge of the airfoil.

In some embodiments, the plurality of magnets includes a first magnet and a second magnet. The second magnet is spaced apart axially from the first magnet and is aligned circumferentially and radially with the first magnet. The band of the magnet ring includes a strip of abradable material located axially between the first magnet and the second magnet. The stator includes an inner wall and a knife-seal that extends radially away from the inner wall and into the strip of abradable material. In some embodiments, the band further includes a strip of metallic material that extends circumferentially over the first magnet.

In some embodiments, the ram air turbine power system further includes a plurality of turbine inlet guide vanes configured to redirect air moving into the turbine case for interaction with the airfoils of the turbine rotor. The turbine inlet guide vanes are located axially forward of the turbine rotor. The accessory generator includes power off-take wires that extend from the stator windings radially inward along the turbine inlet guide vanes. In some embodiments, the power off-take wires extend along a leading edge of the plurality of turbine inlet guide vanes so that heat from the power off-take wires is supplied to the plurality of turbine inlet guide vanes. In some embodiments, each of the plurality of turbine inlet guide vanes are formed to define radially extending passages therethrough. The ram air turbine power system further includes a cooling system that includes cooling fluid conduits that extend radially through the passages formed in the plurality of turbine inlet guide vanes.

In some embodiments, the plurality of magnets are arranged circumferentially relative to one another around the central axis. Each of the plurality of magnets is oriented so that magnetic directionality is selected such that the plurality of magnets forms a Halbach array configured to provide managed power density.

In some embodiments, the ram air turbine power system is housed in a pod having a turbine inlet configured to be selectively opened and closed to modulate air flow allowed into the turbine case for interaction with the turbine rotor so as to regulate speed of the turbine rotor and thereby control power output of the accessory generator. In some embodiments, the pod has a turbine outlet configured to be selectively opened and closed to modulate air flow allowed out of the turbine case so as to regulate speed of the turbine rotor and thereby control power output of the accessory generator.

According to another illustrative aspect of the disclosure, an independently-powered unit configured to be coupled to an aircraft includes a pod, an accessory system, and a ram air turbine power system. The pod includes attachment points for coupling the unit to the aircraft and defining an interior space. The accessory system is mounted in the interior space of the pod. The ram air turbine power system is mounted in the interior space of the pod and is electrically coupled to the accessory system to provide energy for use by the accessory system.

The ram air turbine power system includes a turbine case, a turbine rotor, and an accessory generator. The turbine case extends around a central axis. The turbine rotor is mounted for rotation about the central axis. The turbine rotor includes a plurality of airfoils that extend from a base radially outward to a tip thereof. The accessory generator is coupled to the turbine rotor.

The accessory generator includes a stator and a magnet ring. The stator includes a plurality of stator windings. The magnet ring includes a band and a plurality of magnets. The plurality of magnets are coupled to the band so that, upon rotation of the magnet ring with the turbine rotor, electrical power is generated for use by the accessory system.

In some embodiments, the band extends circumferentially at least partway about the central axis. The band is coupled to the tip of at least two airfoils included in the plurality of airfoils.

In some embodiments, each of the airfoils defines a chord that extends from a leading edge to a trailing edge of the airfoil. The magnet ring is located axially on a mid-chord of the chord of the airfoil.

In some embodiments, the magnet ring extends circumferentially completely around the central axis and is coupled to each of the airfoils.

In some embodiments, each of the airfoils defines a chord that extends from a leading edge to a trailing edge of the airfoil. The magnet ring extends axially substantially a full axial length of the chord between the leading edge of the trailing edge of the airfoil.

In some embodiments, the plurality of magnets includes a first magnet and a second magnet. The second magnet is spaced apart axially from the first magnet and aligned circumferentially and radially with the first magnet. The band of the magnet ring includes a strip of abradable material located axially between the first magnet and the second magnet. The stator includes an inner wall and a knife-seal that extends radially away from the inner wall and into the strip of abradable material. In some embodiments, the band further includes at least one strip of metallic material that extends circumferentially over the first magnet.

In some embodiments, the pod includes a turbine inlet configured to be selectively opened and closed to modulate air flow allowed into the turbine case for interaction with the turbine rotor so as to regulate speed of the turbine rotor and thereby control power output of the accessory generator. The pod includes a turbine outlet configured to be selectively opened and closed to modulate air flow allowed out of the turbine case so as to regulate speed of the turbine rotor and thereby control power output of the accessory generator.

These and other features of the present disclosure will become more apparent from the following description of the illustrative embodiments.

DETAILED DESCRIPTION OF THE DRAWINGS

Figure 1:
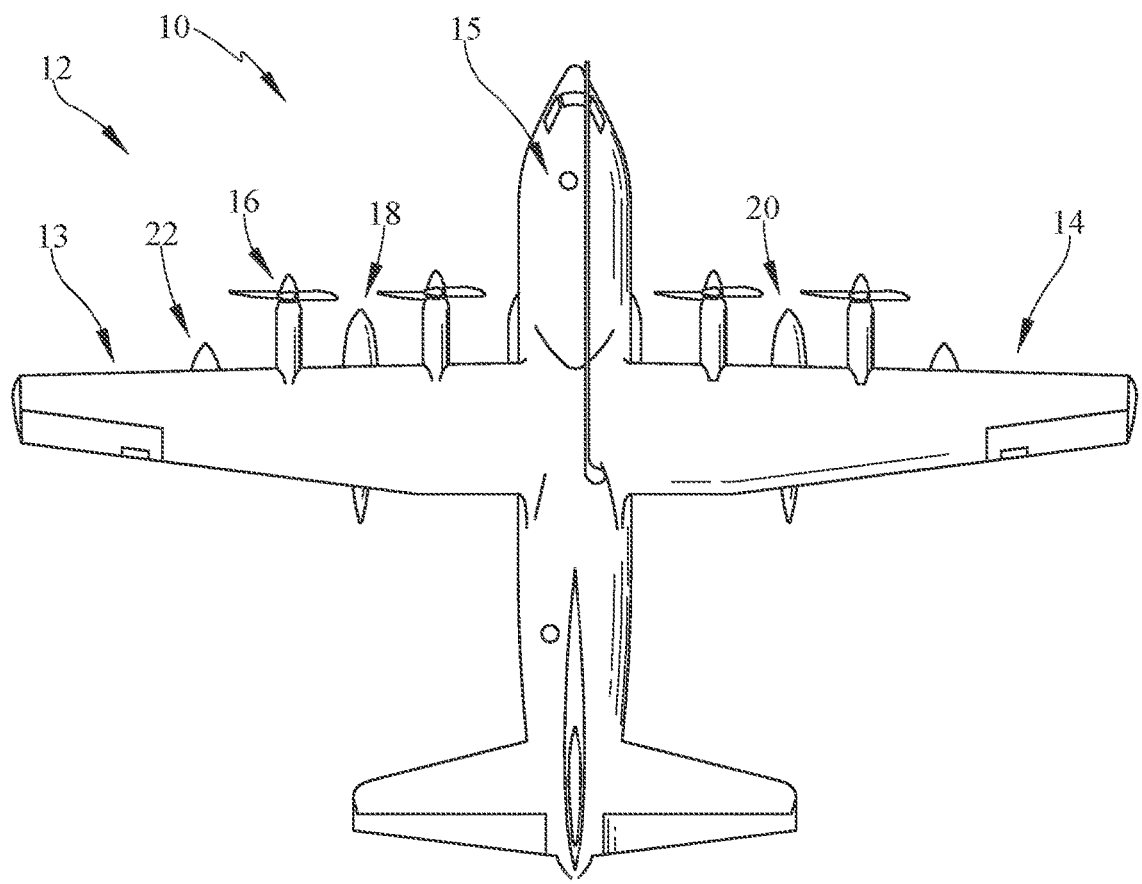
FIG. 1 is a top view of an aircraft in accordance with the present disclosure showing various gas turbine engines, pods, and missiles detachably coupled to wings of the aircraft, the various pods including a radar jamming pod housing a ram air turbine power system for powering radar jamming electronics in the pod.

For the purposes of promoting an understanding of the principles of the present disclosure, reference will now be made to an illustrative embodiment shown in the drawings.

An aircraft 10 in accordance with the present disclosure can be outfitted in a modular fashion with different accessory weapons and systems as suggested in FIG. 1. The aircraft 10 includes an airframe 12 with wings 13, 14 extending from a fuselage 15, a propulsion system 16, as well as various detachable units/pods 18, 20 and missiles 22. The propulsion system 16 is illustratively provided by a gas turbine engine housed in the airframe 12. The units 18, 20 and missiles 22 are detachably coupled to wings 13, 14 and/or fuselage 15 of the aircraft 10.

Figure 2:
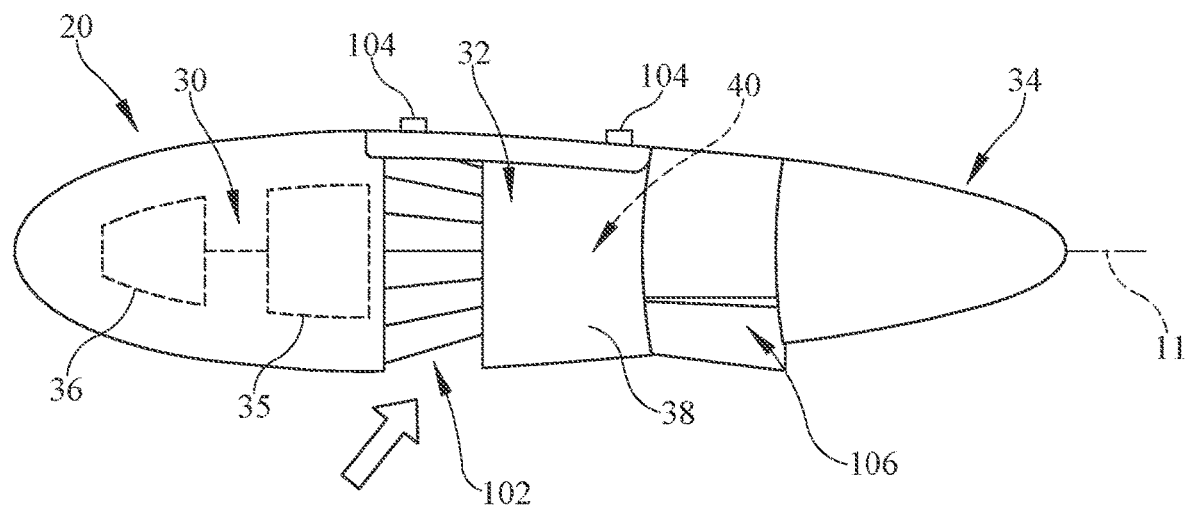
FIG. 2 is a side view of the radar jamming pod of FIG. 1 showing that the pod includes an aircraft attachment point as well as inlet/outlet doors that can be selectively opened to allow air to interact with the ram air turbine power system.

In the illustrative embodiment, one detachable accessory unit 20 is a radar jamming pod as suggested in FIG. 2. The accessory unit 20 includes a power-consuming accessory system 30 and a ram air turbine power system 32 arranged in a detachable pod or housing 34. The ram air turbine power system 32 generates electrical power from air passing through the unit 20 when the aircraft 10 is in flight. Electrical power from the ram air turbine power system 32 is passed to the accessory system 30 independent of direct mechanical or electrical connection to the propulsion system 16. Thus, the accessory unit 20 is, at least primarily, self-powered. The ram air turbine power system 32 does not include and is not powered with a compressor and combustor as typically used in gas turbine engines of propulsion system 16.

The accessory system 30 included in the accessory unit 20 is illustratively made up of power electronics 35 and radar jamming electronics 36 as suggested diagrammatically in FIG. 2. The power electronics 35 may be a rectifier 35. The radar jamming electronics 36 are configured to radiate signals suitable for interfering with enemy radar. In other embodiments, the accessory system 30 can include sensor electronics, energy weapon electronics, battery packs, and/or other power-consuming devices.

Figure 3:
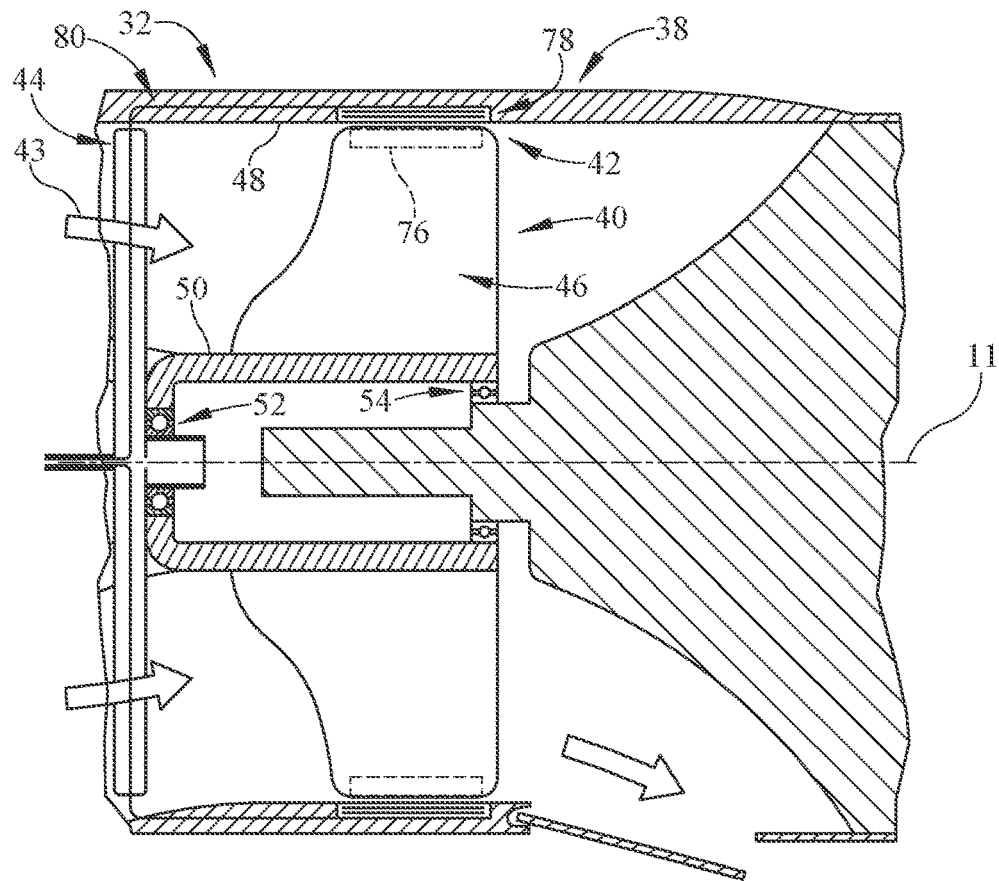
FIG. 3 is a cross-sectional view of a portion of the radar jamming pod of FIG. 2 showing that the ram air turbine power system includes a turbine rotor with airfoils having magnets attached to the tips thereof and an accessory generator with a stator arranged around the airfoils and coupled with a turbine case.
Figure 4:
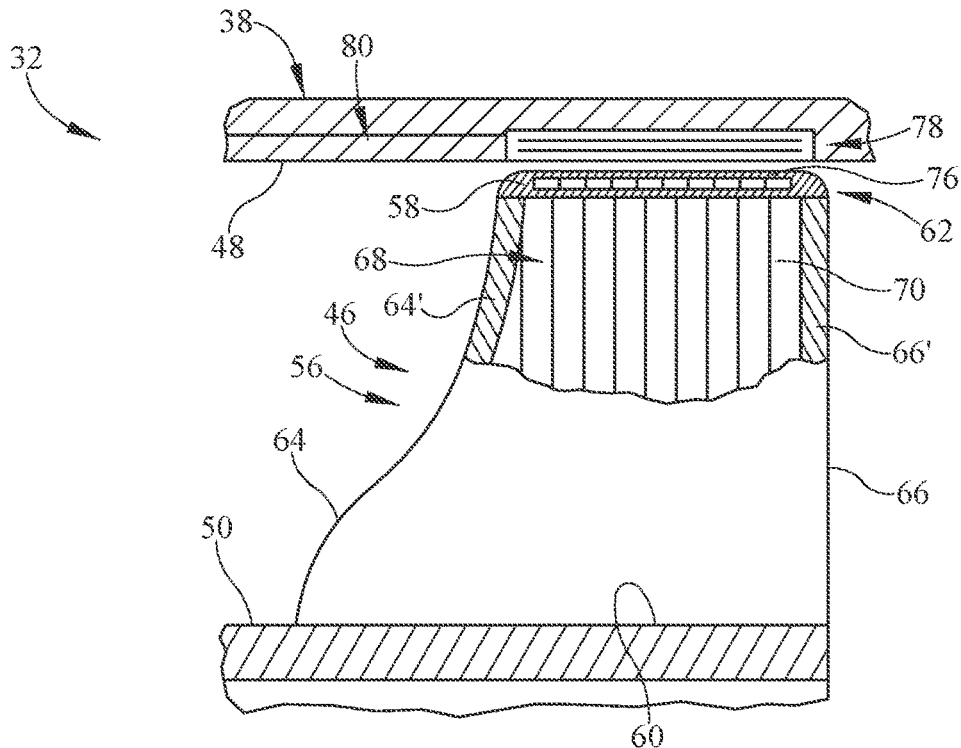
FIG. 4 is a cross-sectional view of a portion of the ram air turbine power system of FIG. 3 showing that the accessory generator includes a plurality of magnets located at a tip of the airfoil.

The ram air turbine power system 32 in the illustrated embodiment integrates power generation components with turbine components to manage space claim and offer unique functionality to the accessory unit 20 as suggested in FIGS. 3-4. The ram air turbine power system 32 includes a turbine case 38, a turbine rotor 40, an accessory generator 42, and turbine inlet guide vanes 44. The turbine case 38 extends around a central axis 11 and defines a radially-outer limit of a flow path through which air moves to interact with the turbine rotor 40. The turbine rotor 40 is mounted for rotation about the central axis 11. The accessory generator 42 generates power for use by the accessory system 30. The turbine inlet guide vanes 44 are configured to redirect air moving into the turbine case 38 for interaction with airfoils 46 of the turbine rotor 40.

The turbine rotor 40 includes an outer diameter 48, an inner diameter 50, airfoils 46, and bearings 52, 54, as shown in FIG. 3. The outer diameter 48 is adjacent to the turbine case 38. The inner diameter 50 is spaced radially inward of the outer diameter 48. The airfoils 46 are arranged between the outer diameter 48 and the inner diameter 50. The bearings 52, 54 support the turbine rotor 40 for rotation about the central axis 11. In some embodiments, more than two bearings 52, 54 may be used to support the turbine rotor 40 for rotation about the central axis 11.

Figure 5:
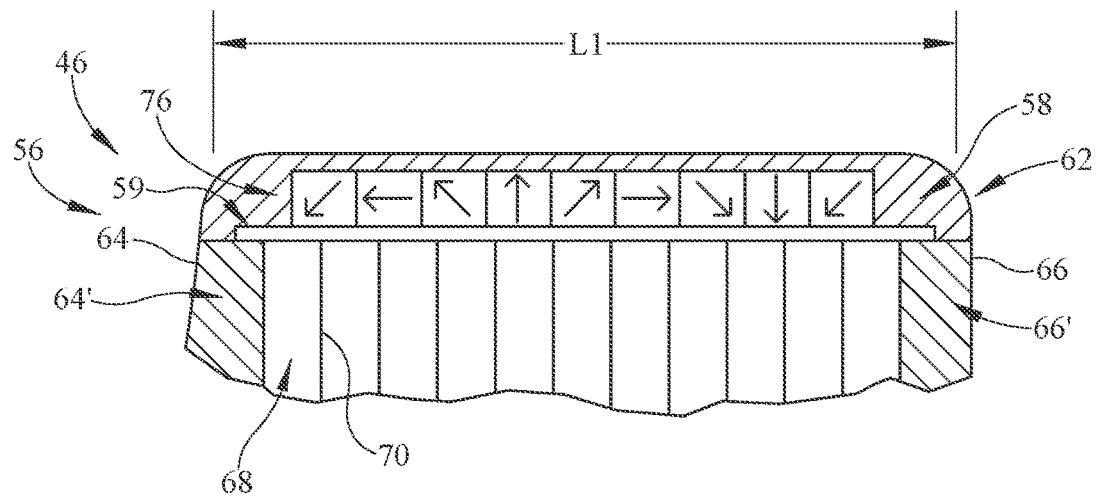
FIG. 5 is a cross-sectional view of a portion of the airfoil of FIG. 4 showing the plurality of magnets with diagrammatic arrows shown for reference and indicating a preselected orientation of the magnetic directionality so as to form a Halbach array configured to produce smooth, managed power density generation in windings of the stator upon rotation of the magnets.
Figure 6:
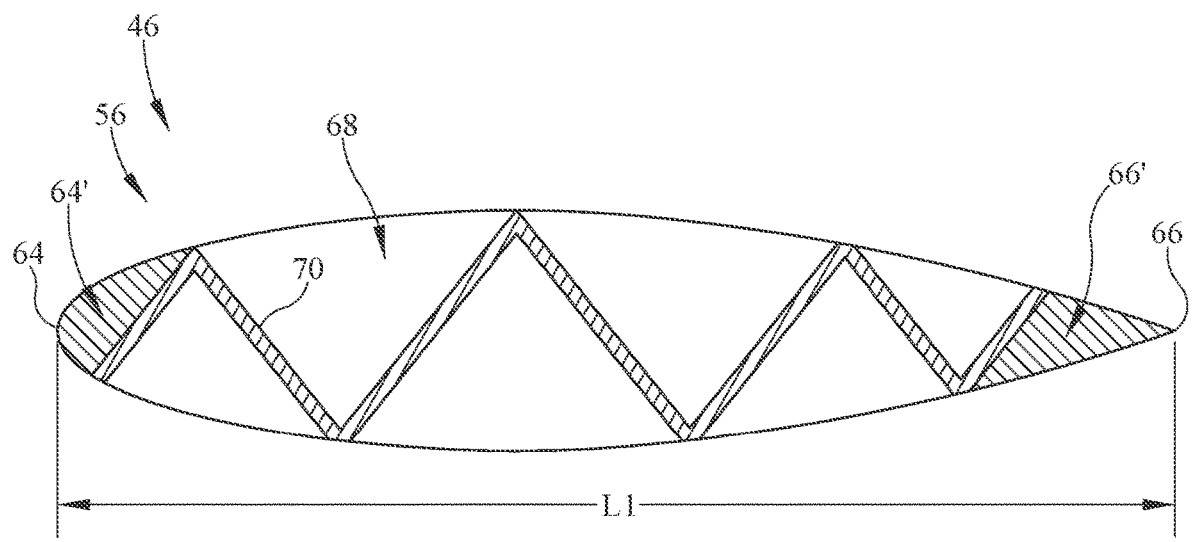
FIG. 6 is a cross-sectional view of the airfoil of FIGS. 3-4 showing that the airfoil includes a cavity and a corrugation sidewall located in the cavity.
Figure 7:
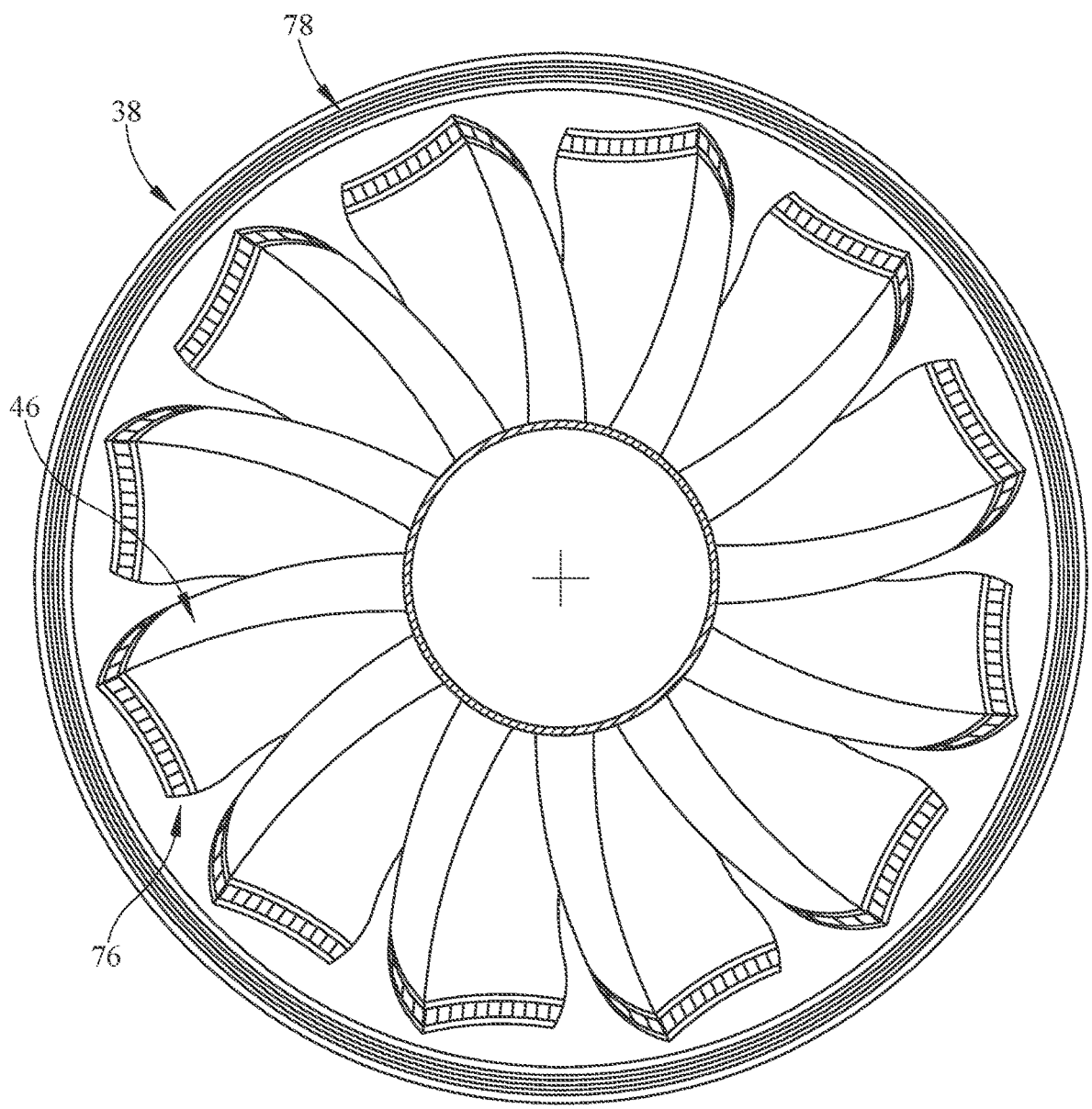
FIG. 7 is an aft looking elevation view of the ram air power turbine system showing magnets of the accessory generator coupled to the airfoil tips and arranged radially inward of the stator windings.

Each airfoil 46 includes a body 56 defined by a base 60, a tip 62, a leading edge 64, and a trailing edge 66, as shown in FIGS. 4-6. The base 60 is coupled to the inner diameter 50 of the turbine rotor 40. The tip 62 is in confronting relation with the turbine case 38. The leading edge 64 and the trailing edge 66 each extend radially between the base 60 and the trailing edge 62. A skin 58 extends along the tip 62 of the airfoil 46.

In some embodiments, the body 56 may also form a cavity 68, as shown in FIGS. 4-6. A corrugation sidewall 70 may be located in the cavity 68 and extend axially from the leading edge 64 to the trailing edge 66 of the body 56. The leading edge 64 and the trailing edge 66 may be a solid leading edge 64' and a solid trailing edge 66', as shown in FIG. 6. In other embodiments, the cavity 68 may be hollow without a corrugation sidewall 70. In further embodiments, the body 56 may be solid.

The airfoils 46 also include a chord that is defined by a full axial length L1, as shown in FIGS. 5-6. The full axial length L1 is the axial length between the leading edge 64 and the trailing edge 66. A mid-chord is less than the full axial length L1.

The accessory generator 42 includes a plurality of magnets 76, a stator 78, and power off-take wires 80 as shown in FIGS. 3-4. The plurality of magnets 76 are coupled inside the tip 62 of each airfoil 46. The stator 78 is coupled with the turbine case 38 and is axially aligned with the airfoils 46. The power off-take wires 80 extend from the stator 78 through the inlet guide vanes 44 so as to route electrical power to the accessory system. Upon rotation of the plurality of magnets 76 with the turbine rotor 40, electrical power is generated for use by the accessory system 30.

The plurality of magnets 76 includes magnets arranged circumferentially adjacent to one another around the central axis 11 as shown in FIGS. 4, 5, 7, and 13. Each of the magnets 76 may be oriented so that magnetic directionality is specifically selected. The plurality of magnets 76 may form a Halbach array configured to provide managed power density, as shown in FIG. 5. Additionally, the plurality of magnets 76 are in direct thermal contact with the airfoils 46 so that heat generated in the plurality of magnets 76 is dissipated through the airfoils 46 and other turbine components exposed to air flow moving through the turbine case 38.

As shown in FIGS. 3-5, the plurality of magnets 76 are covered by a skin 58 that extends along the tip 62 of the airfoil 46 to block radial movement of the plurality of magnets 76 away from the airfoil body 56. At least one of the magnets 76 is bonded to a material 59, as shown in FIG. 5. The material 59 is bonded to the solid leading edge 64' and the solid trailing edge 66', and the skin 58 is bonded to the magnets 76, the material 59, the solid leading edge 64', and the solid trailing edge 66'. In some embodiments, the material 59 is metal. In other embodiments, the material 59 is a metallic strip. In some embodiments, the material 59 is fixed to the solid leading edge 64' and the solid trailing edge 66'. In some embodiments, the plurality of magnets 76 may be bonded only to the skin 58 and the skin may be bonded to the solid leading edge 64' and the solid trailing edge 66'. In further embodiments, at least one of the magnets 76 may be coupled in the cavity 68 of the airfoil 46 and coupled to the corrugation sidewall 70.

In other embodiments, the plurality of magnets 76 are formed into a magnet ring 82 coupled to the tip 62 of the airfoils 46, as shown in FIG. 8-11. The magnet ring 82 includes band 84 and the plurality of magnets 76. The band 84 extends circumferentially at least partway about the central axis 11 and is coupled to the tip 62 of at least two airfoils 46. The plurality of magnets 76 are at least arranged axially and aligned radially to each other, and are coupled to the band 84 so that, upon rotation of the magnet ring 82 with the turbine rotor 40, electrical power is generated for use by the accessory system. In other embodiments, the magnet ring 82 extends circumferentially completely around the central axis 11 and is coupled to each of the airfoils 46. In some embodiments, each of the plurality of magnets 76 may be oriented so that magnetic directionality selected such that the plurality of magnets forms a Halbach array configured to provide managed power density.

Figure 8:
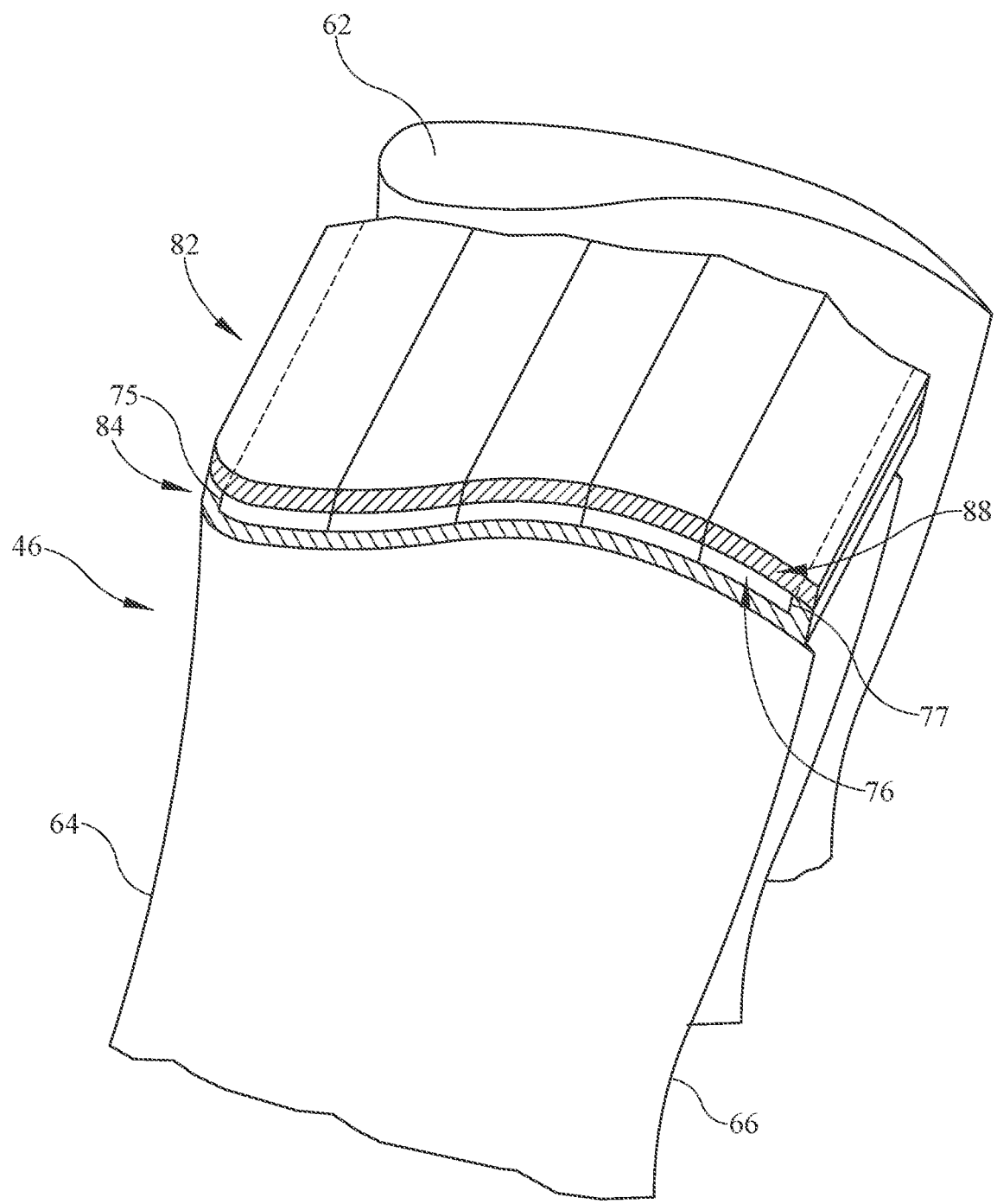
FIG. 8 is a perspective view of another ram air turbine power system adapted for use in the pod of FIG. 2 showing that the accessory generator includes a magnet ring including a band coupled to the tip of the airfoils and a plurality of magnets coupled with the band.

In the illustrated embodiment of FIG. 8, the magnet ring 82 extends axially substantially a full axial length L1 of the chord between the leading edge 64 and the trailing edge 66. As described above, each airfoil 46 defines a chord that extends from the leading edge 64 to the trailing edge 66 of the airfoil 46. In the present embodiment, the band 84 extends radially outwardly between the leading edge 64 of the airfoil 46 and a leading edge 75 of the plurality of magnets 76 and between the trailing edge 66 of the airfoil 46 and a trailing edge 77 of the plurality of magnets 76 so that the plurality of magnets 76 cannot shift axially. In other embodiments, the leading edge 75 and the trailing edge 77 of the plurality of magnets 76 may axially align with the leading edge 64 and trailing edge 66 of each of the airfoils 46 so that the band 84 does not extend radially outwardly.

Figure 10:
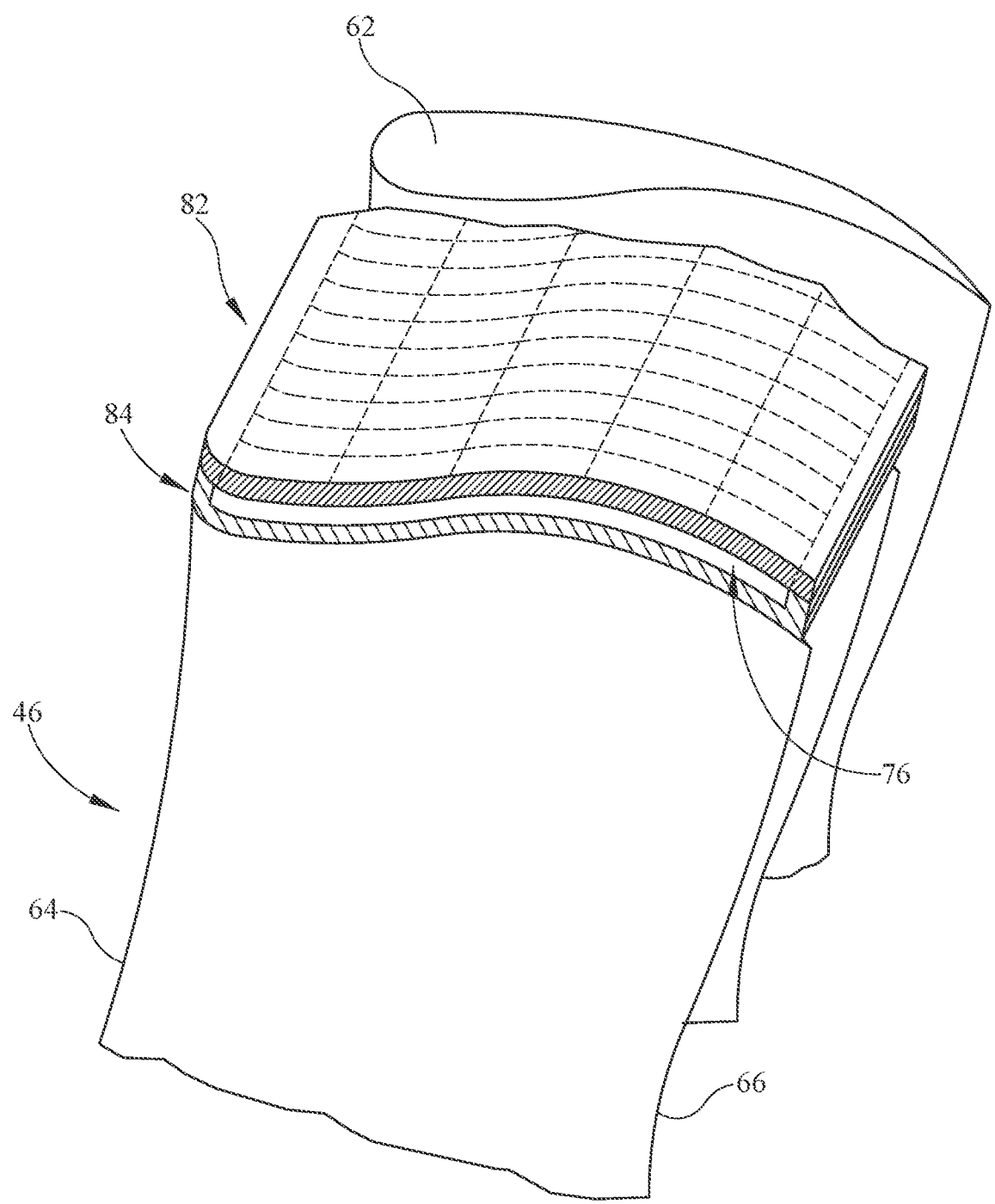
FIG. 10 is a perspective view of another ram air turbine power system adapted for use in the pod of FIG. 2 showing that the accessory generator includes a magnet ring that extends axially substantially a full axial length of the chord of the airfoil and includes a band coupled to the tip of the airfoils and a plurality of magnets coupled with the band.

The band 84 also includes a plurality of strips of metallic material 88 that extend circumferentially over the plurality of magnets 76 such that the plurality of strips of metallic material 88 axially align with the leading edge 64 and the trailing edge 66 of the airfoil 46, as shown in FIGS. 8 and 10. In optional embodiments, the plurality of strips of metallic material 88 may extend to the leading edge 75 and the trailing edge 77 of the plurality of magnets 76 and the band 84 may extend radially outwardly to the outer surface of the plurality of strips of metallic material 88 in a manner described above. In other embodiments, the plurality of strips of metallic material 88 may only be one strip of metallic material 88, as shown in FIG. 10. In some embodiments, the band 84 may not include a plurality of strips of metallic material 88 and may instead include one or more of strips of abradable material 86.

Figure 9:
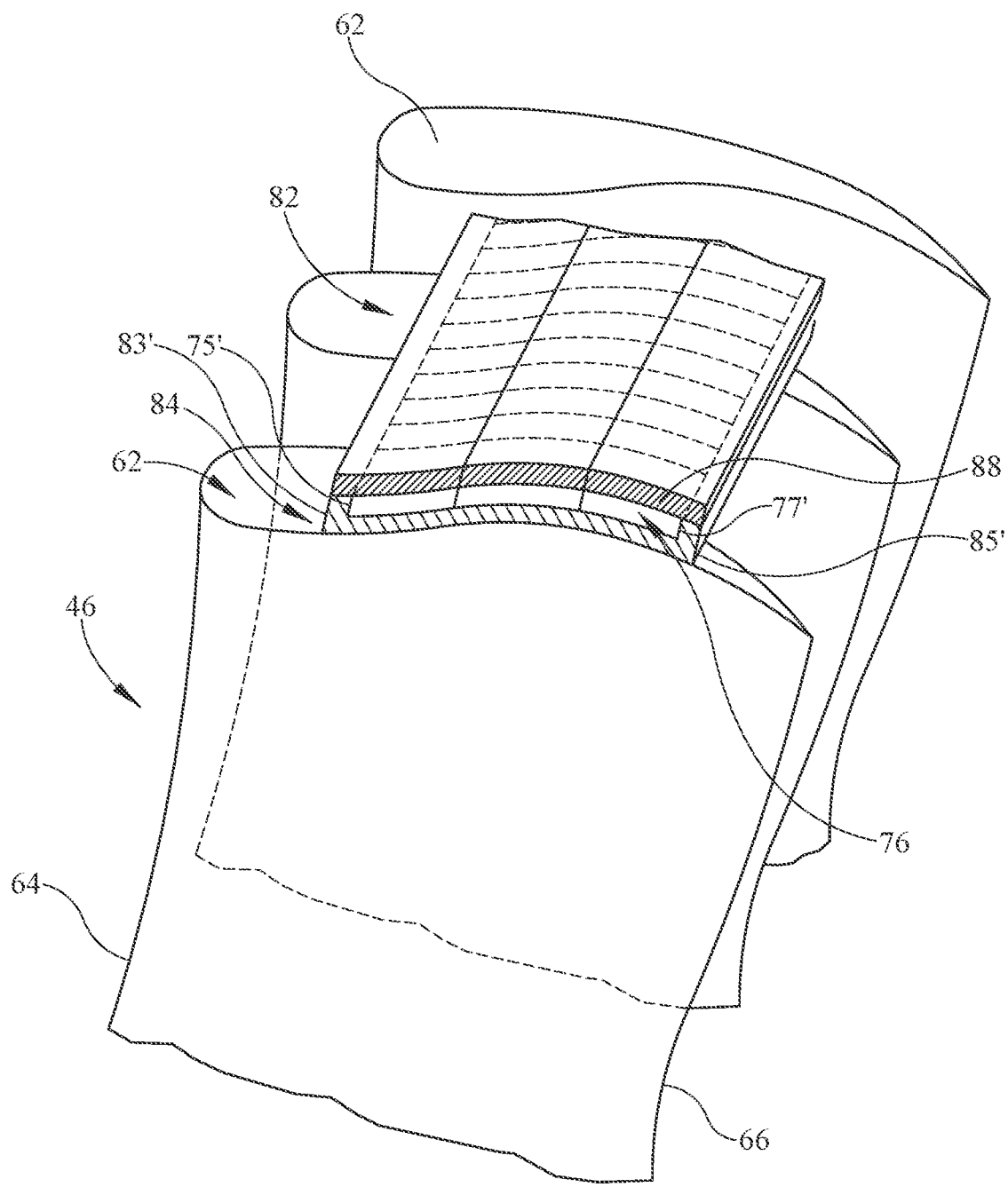
FIG. 9 is a perspective view of another ram air turbine power system adapted for use in the pod of FIG. 2 showing that each airfoil defines a chord that extends from a leading edge to a trailing edge of each of the airfoils and the accessory generator includes a magnet ring located axially on a mid-chord of the chord of the airfoil and includes a band coupled to the tip of the airfoils and a plurality of magnets coupled with the band.

In another embodiment, the magnet ring 82 is located axially on a mid-chord of the chord of the airfoil 46, as shown in FIG. 9. In the present embodiment, the band 84 extends radially outwardly between the leading edge 64 of the airfoil 46 and a leading edge 75' of the plurality of magnets 76 and between the trailing edge 66 of the airfoil 46 and a trailing edge 77' of the plurality of magnets 76 so that the plurality of magnets 76 cannot shift axially. In the illustrated embodiment, a leading edge 83' of the band 84 is located axially between the leading edge 64 and the leading edge 75', and a trailing edge 85' of the band is located axially between the trailing edge 77' and the trailing edge 66. In other embodiments, the leading edge 75' and the trailing edge 77' of the plurality of magnets 76 may axially align with the leading edge 83' and the trailing edge 85' so that the band 84 does not extend radially outwardly.

The band 84 of FIG. 9 also includes a plurality of strips of metallic material 88 that extend circumferentially over the plurality of magnets 76 such that the plurality of strips of metallic material 88 axially align with the leading edge 83' and the trailing edge 85' of the band 84. In optional embodiments, the plurality of strips of metallic material 88 may extend to the leading edge 75' and the trailing edge 77' of the plurality of magnets 76 and the band 84 may extend radially outwardly to the outer surface of the plurality of strips of metallic material 88 in a manner described above. In other embodiments, the plurality of strips of metallic material 88 may only be one strip of metallic material 88. In some embodiments, the band 84 may not include a plurality of strips of metallic material 88 and may instead include one or more of strips of abradable material 86.

In the embodiments illustrated in FIGS. 9 and 10, the plurality of magnets 76 are discrete and located next to each other axially. The plurality of magnets 76 are also located next to each other circumferentially and are aligned radially.

Figure 11:
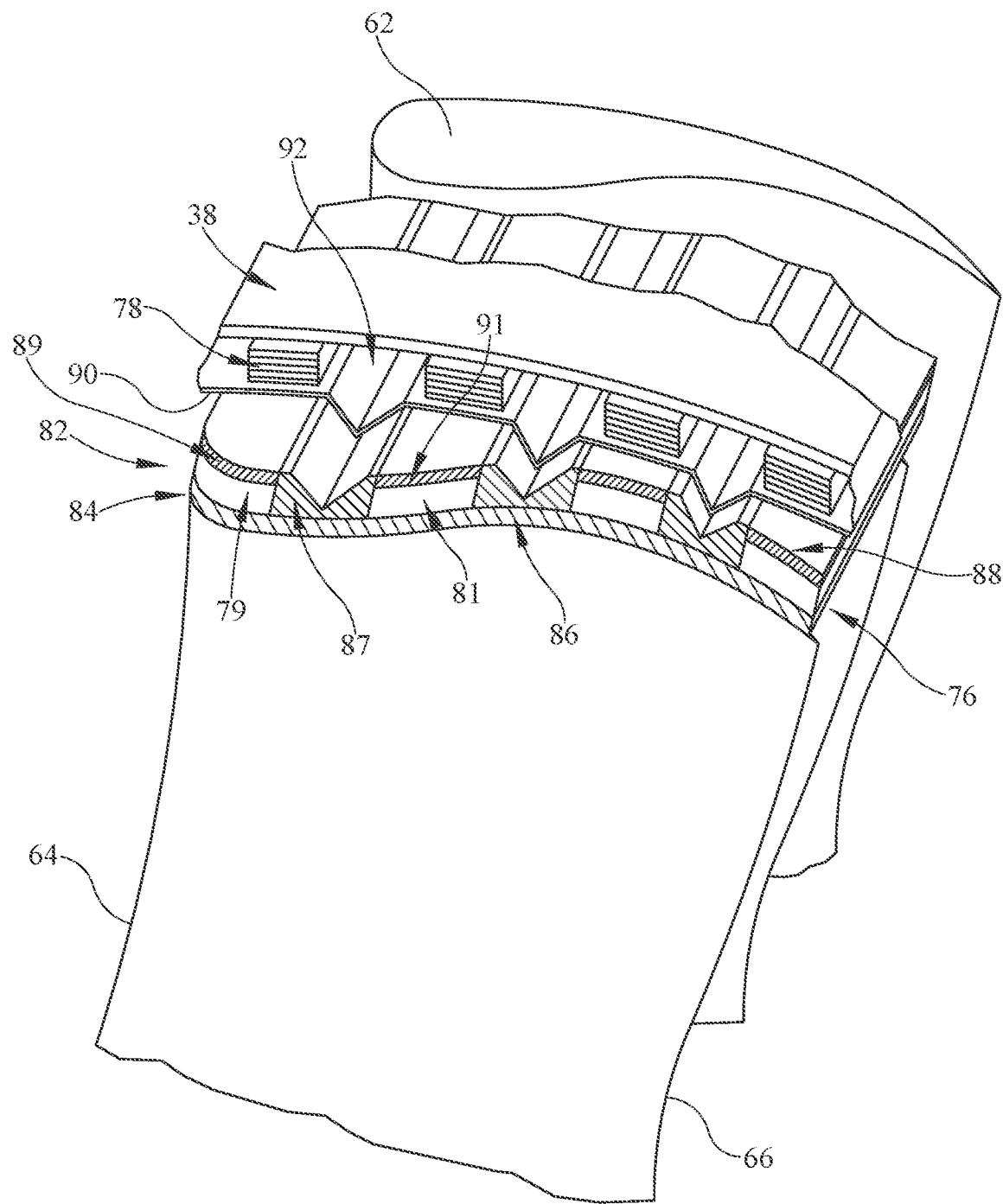
FIG. 11 is a perspective view of another ram air turbine power system adapted for use in the pod of FIG. 2 showing that the accessory generator includes a plurality of magnet rings each including a band coupled to the tip of the airfoils and a plurality of magnets coupled with the band, and each of the magnet rings are spaced apart axially by a strip of abradable material located axially between each magnet ring, and the stator includes an inner wall and a knife-seal that extends radially away from the inner wall and into each strip of abradable material.

FIG. 11 shows that each of the plurality of magnets 76 in the magnet ring 82 are spaced apart axially from each other and aligned circumferentially and radially with each other. The band 84 of the magnet ring 82 includes a plurality of strips of abradable material 86 located axially between each of the plurality of magnets 76. The band 84 also includes a plurality of strips of metallic material 88 that extend circumferentially over each of the plurality of magnets 76. The turbine case 38 includes an inner wall 90 and a knife seal 92 that extends radially away from the inner wall and into each of the plurality of strips of abradable material 86.

For example, the plurality of magnets 76 in FIG. 11 includes a first magnet 79 and a second magnet 81. The second magnet 81 is spaced apart axially from first magnet 79 and is aligned radially with the first magnet 79. A strip of abradable material 87 is located axially between the first magnet 79 and second magnet 81. A first strip of metallic material 89 extends circumferentially over the first magnet 79 and a second strip of metallic material 91 extends circumferentially over the second magnet 81.

Figure 13:
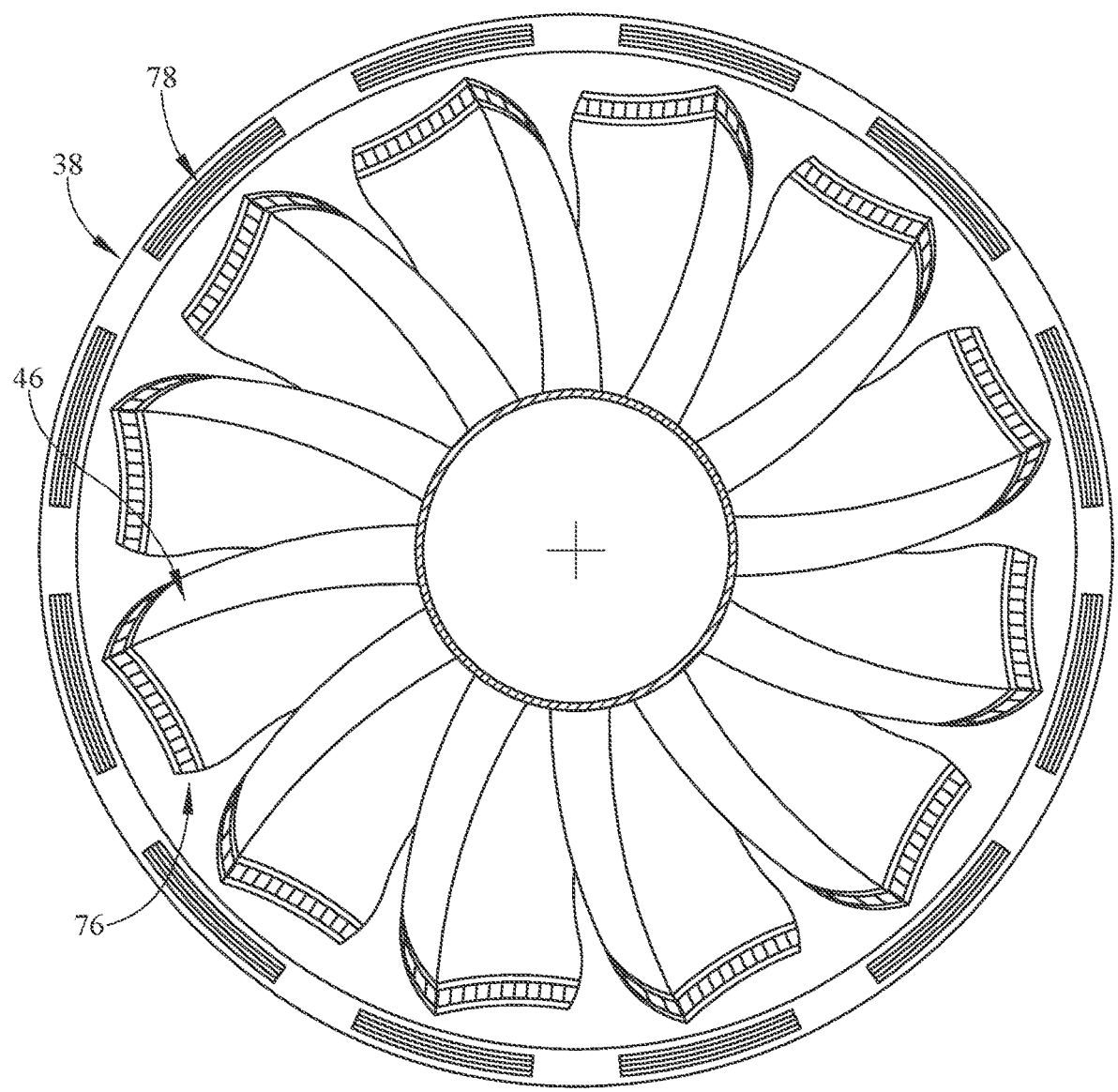
FIG. 13 is an aft looking elevation view of the magnets of an embodiment of the accessory generator coupled to the airfoil tips and arranged radially inward of a plurality of stator windings.

The stator 78 may include concentrated or distributed windings. The stator 78 may extend circumferentially around the turbine case 38 as suggested in FIG. 7. In other embodiments, the stator 78 may be a plurality of stators 78 spaced circumferentially apart around the turbine case 38 and aligned with the airfoils 46 as shown in FIG. 13.

Figure 12:
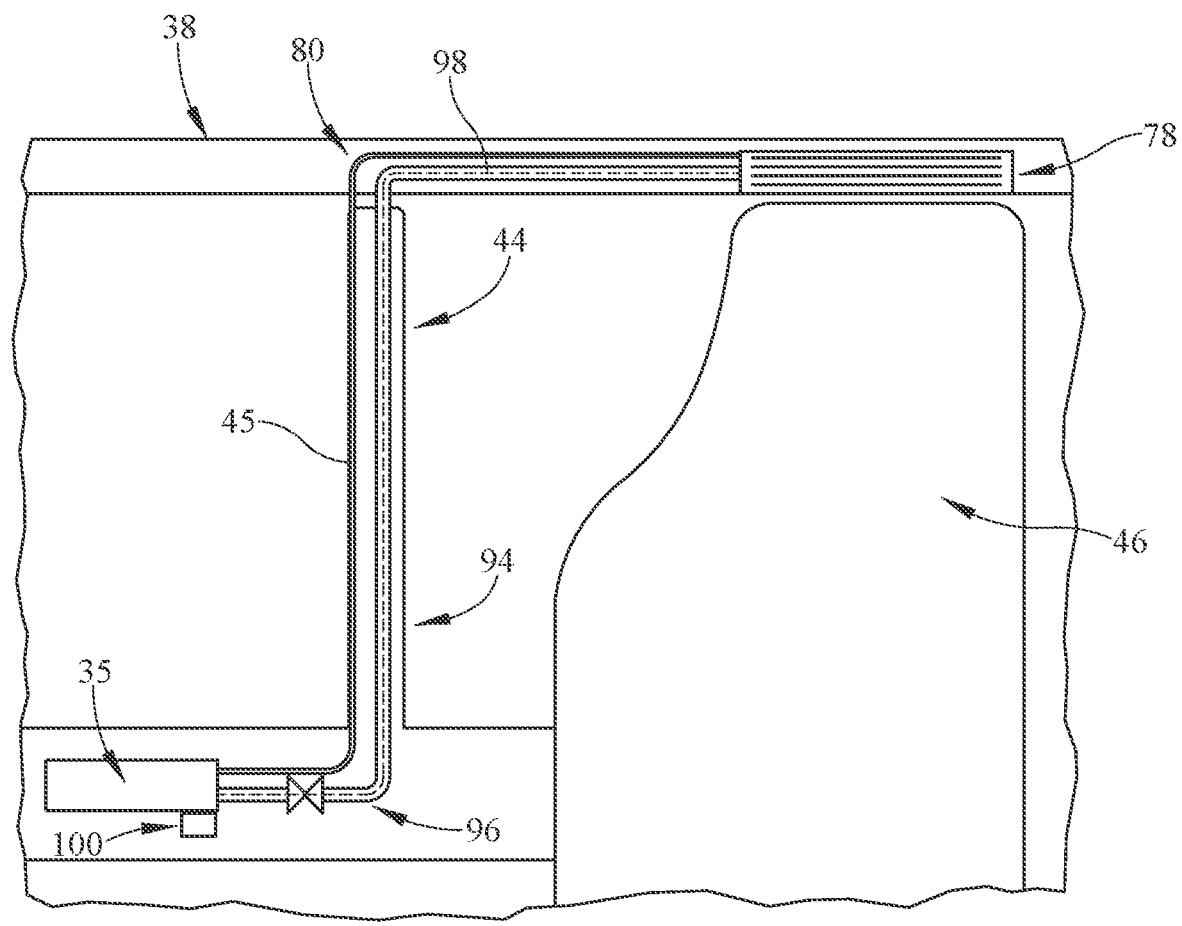
FIG. 12 is a cross-sectional view of a portion of the radar jamming pod of FIG. 2 showing that the radar jamming pod includes an inlet guide vane, an accessory system with a rectifier, a winding and a conduit, with the winding and conduit interconnecting the rectifier and the stator, and a coolant flowing between the rectifier and the stator in the conduit.

In the illustrated embodiment of FIG. 12, the ram air turbine power system 32 may include an electrical generation system 93 and a cooling system 94. The electrical generation system 93 is configured to be driven by the turbine rotor 40 to generate and deliver electrical power to the accessory system 30. The cooling system 94 is configured to cool the electrical generation system 93. In the embodiments shown in FIGS. 3 and 12, the inlet guide vanes 44 are located axially forward of the turbine rotor 40. Additionally, the turbine case 38 defines a gas path 43, as shown in FIG. 3.

The electrical generation system 93 includes the accessory generator 42 and the rectifier 35, as shown in FIG. 12. The accessory generator 42 is coupled with the turbine rotor 40. The rectifier 35 is electrically connected between the accessory generator 42 and the accessory system 30.

The cooling system 94 includes a conduit 96, cooling fluid 98 located in the conduit 96, and a controller 100, as shown in FIG. 12. The conduit 96 extends radially between the stator 78 and the rectifier 35 through the inlet guide vane 44. The conduit 96 is in thermal communication with the rectifier 35 and the gas path 43 to transfer heat from the rectifier 35, to the cooling fluid 98, and then to the gas path 43. The controller 100 is programmed to generate signals to vary a position of a turbine inlet 102 and/or a turbine outlet 106 in response to at least one of the speed of the turbine, the speed of the turbine increasing, power generated by the generator, power generated by the generator increasing, a temperature of the rectifier, a temperature of the rectifier increasing, ambient air temperature, and/or ambient air temperature increasing. The controller 100 is coupled to the rectifier 35, however in other embodiments the controller 100 may be separate from the rectifier 35.

The power off-take wires 80 extend from the stator 78 radially inward through the turbine inlet guide vanes 44, as shown in FIGS. 3 and 12. Heat from the power off-take wires 80 is supplied to the turbine inlet guide vanes 44. In the embodiment shown in FIG. 12, the power off-take wires 80 extend radially inward along a leading edge 45 of the turbine inlet guide vanes 44 and may be used for a heat source and provide anti-ice capabilities. In other embodiments, at least some of the power off-take wires 80 loop radially outward of the turbine inlet guide vanes 44 such that the heat from the power off-take wires 80 provides anti-ice protection from the ram air turbine power system 32. Anti-ice protection for the ram air turbine power system 32 may also be achieved by switching at least some of the power off-take wires on and off. In some embodiments, the power-off take wires 80 may extend along a leading edge 45 of the turbine inlet guide vanes 44 so that heat from the power off-take wires is supplied to the turbine inlet guide vanes 44.

The detachable pod or housing 34 illustratively includes attachment points 104 for coupling to hard point attachment points of the aircraft 10 as suggested in FIGS. 1 and 2. The pod 34 defines an interior space that houses the accessory system 30 and the ram air turbine power system 32. The pod 34 includes an inlet door 102 configured to be selectively opened and closed to modulate air flow allowed into the turbine case 38 for interaction with the turbine rotor 40 so as to regulate speed of the turbine rotor 40 and thereby control power output of the accessory generator 42. The pod 34 also includes an outlet door 106 configured to be selectively opened and closed to modulate air flow allowed out of the turbine case 38 so as to regulate speed of the turbine rotor 40 and thereby control power output of the accessory generator 42. Inlet and outlet doors 102, 106 may be moved among various opened positions by an actuator powered by the ram air turbine power system 32, a battery, the propulsion system 16, and/or mechanical linkages also suitable for release of missiles etc.

According to the present disclosure, a ram air turbine 40 provides mechanical energy to an electrical generator 42 for DC power. In some designs, a ram air turbine 40 is a separate unit; the generator 42 is a separate unit; and the rectifier 35 is a separate unit. Designs in accordance with the present disclosure can be lighter and smaller because of the integrated solution.

In the illustrative example, the generator 42 is integrated into the airfoil tip 62 and the turbine case 38 and is arranged with the rotor magnets 76 in the airfoil tip 62 and the stator windings 78 in the turbine case 38. This eliminates a shaft and rotor of a separate generator while simplifying the overall design. The stator 78 then goes inside the turbine case 38 and exits through the inlet guide vanes 44. Designs with features like those shown can require a precise stator arrangement in order to preserve a small air gap between the stator windings 78 and magnets 76. Forward and/or aft bearings 52, 54 can provide the transition between rotating and stationary frames of reference. If required, an oil mist can cool the stator windings 78 and be scavenged out the tube containing the wires. In the illustrative example, the power electronics 35, such as the rectifier 35, controls the power offtake of the aircraft 10.

Thermal benefits may be available using designs like those discloses. Specifically, more heat can be managed with the magnets 76 coupled to the airfoil tip 62 since the airfoils 46 act as a large heat sink exposed to the incoming air stream.

There exists a need for a tightly integrated, lighter, and smaller ram air turbine 40 and generator 42 into a single unit.

The ram air turbine 40 and the generator 42 may be integrated by putting the magnets 76 of the generator 42 in or at the tip 62 of the turbine blades 46 with the stator 78 radially outward of the turbine blades 46 as shown in FIG. 5. The turbine blades 46 may be hollow. A second way to achieve this may be by having the magnets 76 of the generator 42 arranged in a thin ring 82 that spans the tips 62 of the turbine blades 46 with the stator 78 radially outward of the turbine blades 46 as suggested in FIG. 9. Finally, the magnets 76 of the generator 42 may be a ring 82 that extends the entire chord-length of the tips 62 of the turbine blades 46 with the stator 78 radially outward of the turbine blades 46 as suggested in FIGS. 8, 10, and 11.

The turbine blades 46 may be hollow with customized tips 62 that contain the magnets 76. The magnets 76 may be in a Halbach array. A cross-section of the turbine blade 46 would show solid leading and trailing edges 64', 66' with corrugated stiffeners 70. The space 68 between the corrugations 70 are hollow, which would reduce the weight of the turbine blade 46. The magnets 76 are bonded to a material 59, such as bonded to metal 59, and the material 59 is bonded to the solid leading and trailing edges 64', 66'. An airfoil skin 58 surrounds the turbine blade 46 and the magnets 76.

In other embodiments, the magnets 76 may be on top of the tips 62 of the airfoils 46 rather than embedded in the airfoil 46 and the stator 78 would be in the turbine case 38. The wiring from the stator 78 goes through the inlet guide vane 44 to reach the rectifier 35. This would eliminate the need for an output shaft to transfer torque, so the hub may be smaller than other applications. The wiring may be thick depending on the wire gauge required and the power generated.

In other embodiments, because the magnets 76 would span the entire chord-length of the airfoils 46, the height of the magnets 76 and the height of the windings 78 may be significantly reduced compared to the embodiment of FIGS. 4 and 5 and the embodiment of FIG. 9.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An aircraft comprising
   a propulsion system configured to produce thrust for driving the aircraft during operation,
   an accessory system electrically de-coupled from the propulsion system so as not to directly draw power from the propulsion system, and
   a ram air turbine power system electrically coupled to the accessory system to provide energy for use by the accessory system, the ram air turbine power system including
      a turbine case that extends around a central axis,
      a turbine rotor mounted for rotation about the central axis with an outer diameter in confronting relation with the turbine case, an inner diameter spaced radially inward of the outer diameter, and airfoils arranged between the outer diameter and the inner diameter, wherein each airfoil extends from a base radially outward to a tip thereof, and
      an accessory generator including a stator and a magnet ring, the stator being coupled with the turbine case and axially aligned with the airfoils of the turbine rotor, the stator including a plurality of stator windings, the magnet ring including a band and a plurality magnets, the band extends circumferentially at least partway about the central axis and is coupled to the tip of at least two airfoils included in the plurality of airfoils, and the plurality of magnets being coupled with the band so that, upon rotation of the magnet ring with the turbine rotor, electrical power is generated for use by the accessory system, wherein the plurality of magnets includes a first magnet and a second magnet spaced apart axially from the first magnet and aligned circumferentially and radially with the first magnet, the band of the magnet ring includes a strip of abradable material located axially between the first magnet and the second magnet, and the stator includes an inner wall and a knife-seal that extends radially away from the inner wall and into the strip of abradable material.

2. The aircraft of claim 1, wherein each of the airfoils defines a chord that extends from a leading edge to a trailing edge of the airfoil and at least the second magnet of the plurality of magnets is located axially on a mid-chord of the chord of the airfoil.

3. The aircraft of claim 1, wherein the magnet ring extends circumferentially completely around the central axis and is coupled to each of the airfoils.

4. The aircraft of claim 1, wherein each of the airfoils defines a chord that extends from a leading edge to a trailing edge of the airfoil and the magnet ring extends axially substantially a full axial length of the chord between the leading edge of the trailing edge of the airfoil.

5. The aircraft of claim 1, wherein the band further includes a strip of metallic material that extends circumferentially over the first magnet.

6. The aircraft of claim 1, wherein the ram air turbine power system further includes a plurality of turbine inlet guide vanes configured to redirect air moving into the turbine case for interaction with the airfoils of the turbine rotor, the turbine inlet guide vanes are located axially forward of the turbine rotor, and the accessory generator includes power off-take wires that extend from the stator windings radially inward along the turbine inlet guide vanes.

7. The aircraft of claim 6, wherein the power off-take wires extend along a leading edge of the plurality of turbine inlet guide vanes so that heat from the power off-take wires is supplied to the plurality of turbine inlet guide vanes.

8. The aircraft of claim 6, wherein each of the plurality of turbine inlet guide vanes are formed to define radially extending passages therethrough and the ram air turbine power system further includes a cooling system that includes cooling fluid conduits that extend radially through the passages formed in the plurality of turbine inlet guide vanes.

9. The aircraft of claim 1, wherein the plurality of magnets are arranged circumferentially relative to one another around the central axis and each of the plurality of magnets is oriented so that magnetic directionality is selected such that the plurality of magnets forms a Halbach array configured to provide managed power density.

10. The aircraft of claim 1, wherein the ram air turbine power system is housed in a pod having a turbine inlet configured to be selectively opened and closed to modulate air flow allowed into the turbine case for interaction with the turbine rotor so as to regulate speed of the turbine rotor and thereby control power output of the accessory generator.

11. The aircraft of claim 10, wherein the pod has a turbine outlet configured to be selectively opened and closed to modulate air flow allowed out of the turbine case so as to regulate speed of the turbine rotor and thereby control power output of the accessory generator.

12. An independently-powered unit configured to be coupled to an aircraft, the unit comprising a pod with attachment points for coupling the unit to the aircraft and defining an interior space, an accessory system mounted in the interior space of the pod, and a ram air turbine power system mounted in the interior space of the pod and electrically coupled to the accessory system to provide energy for use by the accessory system, wherein the ram air turbine power system includes a turbine case that extends around a central axis, a turbine rotor mounted for rotation about the central axis and having a plurality of airfoils that extend from a base radially outward to a tip thereof, and an accessory generator including a stator and a magnet ring, the stator including a plurality of stator windings and the magnet ring including a band and a plurality of magnets coupled to the band so that, upon rotation of the magnet ring with the turbine rotor, electrical power is generated for use by the accessory system, wherein the plurality of magnets includes a first magnet and a second magnet spaced apart axially from the first magnet and aligned circumferentially and radially with the first magnet, the band of the magnet ring includes a strip of abradable material located axially between the first magnet and the second magnet, and the stator includes an inner wall and a knife-seal that extends radially away from the inner wall and into the strip of abradable material.

13. The independently-powered unit of claim 12, wherein the band extends circumferentially at least partway about the central axis and is coupled to the tip of at least two airfoils included in the plurality of airfoils.

14. The independently-powered unit of claim 12, wherein each of the airfoils defines a chord that extends from a leading edge to a trailing edge of the airfoil and at least the second magnet of the plurality of magnets is located axially on a mid-chord of the chord of the airfoil.

15. The independently-powered unit of claim 12, wherein the magnet ring extends circumferentially completely around the central axis and is coupled to each of the airfoils.

16. The independently-powered unit of claim 12, wherein each of the airfoils defines a chord that extends from a leading edge to a trailing edge of the airfoil and the magnet ring extends axially substantially a full axial length of the chord between the leading edge of the trailing edge of the airfoil.

17. The independently-powered unit of claim 12, wherein the band further includes at least one strip of metallic material that extends circumferentially over the first magnet.

18. The independently-powered unit of claim 12, wherein the pod includes a turbine inlet configured to be selectively opened and closed to modulate air flow allowed into the turbine case for interaction with the turbine rotor so as to regulate speed of the turbine rotor and thereby control power output of the accessory generator, and wherein the pod includes a turbine outlet configured to be selectively opened and closed to modulate air flow allowed out of the turbine case so as to regulate speed of the turbine rotor and thereby control power output of the accessory generator.

19. An aircraft comprising a propulsion system configured to produce thrust for driving the aircraft during operation, an accessory system electrically de-coupled from the propulsion system so as not to directly draw power from the propulsion system, and a ram air turbine power system electrically coupled to the accessory system to provide energy for use by the accessory system, the ram air turbine power system including a turbine case that extends around a central axis, a turbine rotor mounted for rotation about the central axis with an outer diameter in confronting relation with the turbine case, an inner diameter spaced radially inward of the outer diameter, and airfoils arranged between the outer diameter and the inner diameter, wherein each airfoil extends from a base radially outward to a tip thereof, and an accessory generator including a stator and a magnet ring, the stator being coupled with the turbine case and axially aligned with the airfoils of the turbine rotor, the stator including a plurality of stator windings, the magnet ring including a band and a plurality magnets, the band extends circumferentially at least partway about the central axis and is coupled to the tip of at least two airfoils included in the plurality of airfoils, and the plurality of magnets being coupled with the band so that, upon rotation of the magnet ring with the turbine rotor, electrical power is generated for use by the accessory system, wherein the plurality of magnets includes a first magnet and a second magnet spaced apart axially from the first magnet and aligned circumferentially and radially with the first magnet, the band of the magnet ring includes a strip of abradable material located axially between the first magnet and the second magnet, and the stator includes an inner wall and a knife-seal that extends radially away from the inner wall and into the strip of abradable material, and wherein the ram air turbine power system further includes a plurality of turbine inlet guide vanes configured to redirect air moving into the turbine case for interaction with the airfoils of the turbine rotor, the turbine inlet guide vanes are located axially forward of the turbine rotor, and the accessory generator includes power off-take wires that extend from the stator windings radially inward along the turbine inlet guide vanes so that heat from the power off-take wires is supplied to the plurality of turbine inlet guide vanes for anti-ice protection.

20. The aircraft of claim 19, wherein the band further includes at least one strip of metallic material that extends circumferentially over at least one of the plurality of magnets.

* * * * *